United States Patent [19]

Nelson, Jr.

[11] 3,813,498

[45] May 28, 1974

[54] MUSICAL RECORDING WITH RE-ENTRY TRACK

[75] Inventor: Carl S. Nelson, Jr., Los Angeles, Calif.

[73] Assignee: Opsonar Organ Corporation, Bronx, N.Y.

[22] Filed: Nov. 17, 1971

[21] Appl. No.: 199,476

[52] U.S. Cl...... 179/100.3 R, 84/1.18, 179/100.3 B, 274/46 R

[51] Int. Cl........................... G11b 7/00, G10h 3/06

[58] Field of Search............. 179/100.3 R, 100.3 B; 340/174.1; 274/46 R; 84/1.18

[56] References Cited

UNITED STATES PATENTS

| | | | |
|---|---|---|---|
| 1,836,205 | 12/1931 | Townsend | 179/100.3 B |
| 1,836,206 | 12/1931 | Townsend | 179/100.3 R |
| 1,844,672 | 2/1932 | Narath | 179/100.3 R |
| 2,588,680 | 3/1952 | Williams | 84/1.18 |
| 3,230,824 | 1/1966 | Schwartz et al. | 179/100.3 B |

*Primary Examiner*—Raymond F. Cardillo, Jr.
*Attorney, Agent, or Firm*—Alvin Sinderbrand

[57] ABSTRACT

An improvement in the method of recording a closed-loop track on an optical disc music record, so that the joint where the head and tail ends of the recording meet will create a minimum of objectionable effects when the record is played. The recording of the track is extended over slightly more than one revolution of the record to produce a joint region on the record where the head and tail ends of the recording overlap. The musical or other information signals delivered to the recording head, and the bias signal (which determines the width of the track when there is no information signal) delivered to the head, are both gradually increased over several cycles of the music signal at the head end and gradually decreased over several cycles of the music signal at the tail end to provide a smoother transition where the head and tail ends overlap.

4 Claims, 13 Drawing Figures

CARL S. NELSON, JR.
INVENTOR.

BY [signature]

ATTORNEYS

CARL S. NELSON, JR.
INVENTOR.

BY [signature]

ATTORNEYS

INVENTOR.
CARL S. NELSON, JR.
BY [signature]
ATTORNEYS

INVENTOR.
CARL S. NELSON, JR
BY [signature]
ATTORNEYS.

MUSICAL RECORDING WITH RE-ENTRY TRACK

BACKGROUND OF THE INVENTION

This invention relates to musical devices, and more particularly to musical records of the type that have reentrant tracks.

One type of organ utilizes an optical disc record with circular tracks that define the sounds played when corresponding keys of the organ are depressed. Some of the tracks may represent a continuous sound of one pitch such as that which may be made by a flute or mandolin, while other tracks may represent a more complex sound such as an accompaniment arrangement played by several musicians and extending over one or several musical measures. In one organ, a musician can produce relatively complex and professional sounding music by holding down one organ key that plays an accompaniment track and by pressing a series of other keys that play the tracks which represent different pitches to produce a melody. The optical record which defines these sounds, is produced by applying a photographic emulsion to a transparent disc, rotating the disc, and directing a light beam that is modulated in width, against the disc during one revolution of the disc. The width of the light beam is modulated by musical or other information signals obtained by playing a master recording of the music or other information.

Although each optical track is re-entrant, or a closed loop, there is a point along the track where the recording began and another point where the recording ended. If the information signals applied to the light valve or recording head represented a single tone or other repetitive sound, and if the signal at the point where recording began was precisely in phase with the signal occurring after precisely one revolution of the record, then the head and tail of the recording would smoothly merge and the joint would be undetectable. However, such an exact phase relationship seldom occurs, even for a track that represents a sound of one pitch. If the head and tail of the track are out of phase, then a discontinuity will be present, and when the record is played a "pop" or "click" will be sounded every time the joint region is being played. Such a sound is highly objectionable.

One method that has been used to prevent a large discontinuity at the joint involves altering the pitch or frequency of the recording, as by slightly increasing or decreasing the speed of the recording turntable, so that the head and tail are precisely in phase and therefore there is a perfect overlap and an inaudible joint. However, changes in frequency of more than a fraction of 1 per cent may become objectionable, and at lower frequencies a change in pitch exceeding this amount may be required to obtain a perfect overlap. This is especially true where the sound is a complex function that repeats at relatively low frequencies, as in the case of a mandolin sound obtained by rapidly plucking the strings of a mandolin. Furthermore, where the recorded sound changes in character between the head and tail ends, as in the case of an accompaniment track that represents musicians playing different notes at different locations along the track, a precise overlap of the head and tail ends may not be possible regardless of the amount of change in turntable speed during recording. A method of recording re-entrant tracks that minimized objectionable effects at the joints, and which could be applied for a wide variety of music sounds and pitches with a minimum of adjustment, would facilitate the production of the records at low cost. The saving could be considerable, because each record may have a large number of tracks and because numerous different disc records may be provided to enable an organist to choose different accompaniment styles and different instrument sounds for the melodies. Such a method also would be useful in recording complex functions other than music on a re-entrant track, where it is desirable to obtain a smooth joint at the head and tail ends of the track.

OBJECTS AND SUMMARY OF THE INVENTION

An object of the present invention is to provide a method for recording re-entrant music tracks in a manner that minimizes objectionable effects at the joints.

Another object is to provide a record with re-entrant tracks, which has a joint that generates a minimum of objectionable noise when the record is played.

Still another object of the invention is to provide recording apparatus that can be used to record a reentrant music track on a record in a manner that provides a smooth joint that will create a minimum of objectionable noise when the record is played.

In accordance with one embodiment of the present invention, an improved method for recording a closed loop track on an optical disc record is provided, the improvement minimizing objectionable effects at the joint where the head and tail ends of the recording meet. The improvement is applicable to a recording method which involves rotating a transparent disc with a photographic emulsion and directing a light beam at the disc to expose a circular track region on the disc. The light beam is modulated in width by electrical signals corresponding to music or other information that is to be recorded, the nominal width about which the beam is modulated being determined by a bias signal. In accordance with the invention, the beam falls on the disc for slightly more than one complete revolution of the disc so that a head portion of the recording, where the recording begins, overlaps a tail portion of the recording where it ends. The amplification factor by which the original music signals are amplified prior to receipt at the recording head gradually increases from zero to a predetermined level along the head portion, remains constant at that predetermined level during nearly the entire revolution of the record, and then gradually decreases toward zero during at least part of the tail portion of the recording.

The intensity of the light beam used in recording is high enough to fully expose any region that it strikes, so that the width of the generated track along the joint region equals the wider of the two beams that fall on the joint region at each point therealong in a geometric manner. The fact that the head and tail ends decrease in music modulation amplitude (due to decreasing amplification of the music signals) and average width (due to decreasing bias) as they approach one another results in a relatively smooth transition in phase and frequency. This avoids discontinuities that can cause clicks, avoids higher and lower frequency sounds not otherwise present in the music which can sound respectively like "chirps" and "whumps," and avoids any noticeable reduction in sound level at the joint.

The novel features of the invention are set forth with particularity in the appended claims. The invention will be best understood from the following description when read in conjunction with the accompanying drawings.

DESCRIPTION OF THE PREFERRED EMBODIMENTS

Figure 1:
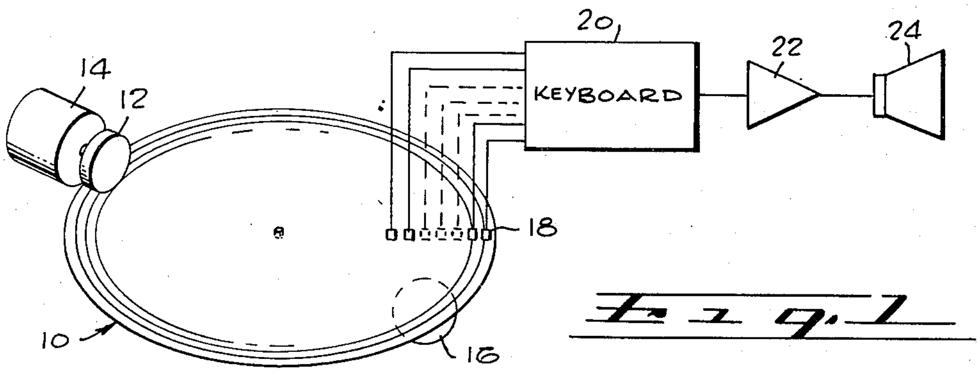
FIG. 1 is a simplified view of an organ which can play an optical disc record.

FIG. 1 illustrates an optical disc record 10 of the invention being played by an organ apparatus that includes a drive wheel 12 driven by a motor 14 to rotate the record 10 at a constant speed such as one revolution every several seconds. The record 10 includes numerous concentric optical tracks that define different musical sounds. For example, one group of tracks may define different notes of a musical scale played by one instrument, while another group of tracks may define one to several music measures of accompaniment patterns suitable for accompanying melodies in different musical keys. A lamp 16 directs light through the tracks of the record while a group of photocells 18 detect the light passing through each of the tracks. The outputs of the photocells pass through a keyboard apparatus 20 to an amplifier 22 and loudspeaker 24. A musician can depress different keys of the keyboard to select which musical sounds will be played.

Figure 2:
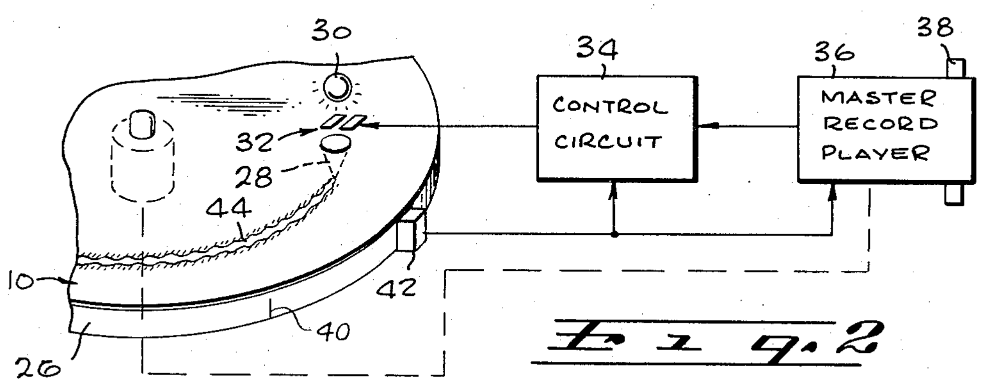
FIG. 2 illustrates a portion of a recording system of the invention.

The production of the optical disc record 10 can be performed by apparatus of the type shown in FIG. 2, which includes a precision motor driven turntable or lath 26 that supports and rotates the optical disc record 10 at a time when its photographic emulsion has not yet been exposed and developed. The apparatus exposes the emulsion by shining a light beam 28 derived from a source 30, through a dual ribbon light valve 32 or other suitable device. An electrical signal that controls the width of the light valve 32 is derived from a control circuit 34 which receives musical signals from a master record player 36. The master record player or signal generator 36 plays a master record 38, which may be in the form of an optical, magnetic, or other recording, and which may be recorded from music played by "live" musicians. Of course, the light valve recording head 32 can be rotated about the optical disc recorded although relative rotational motion is usually obtained by rotating the disc.

The turntable has a marker 40 which can be sensed by a sensor 42 which delivers a signal to the control circuit 34 and master record player 36. The recording on the optical disc may be started when the marker 40 passes the sensor 42, the master player 36 then generating musical signals which the control circuit 34 uses to modulate the light valve 32. Such recording continues for one revolution of the record 10 until the marker 40 is again sensed by the sensor 42, after which the recording beam may be completely blocked. The recording creates a record track 44 which consists of an exposed band that varies in width to define musical sounds. When the photographic emulsion is developed, the track may appear as a clear band on an opaque disc, the band having numerous undulations in width. The track is a closed loop, or re-entrant; that is, the tail end where recording stopped after one revolution of recording, leads in the head end where recording began. When the record track is played, this joint region where the head and tail ends meet will be sounded every time the record makes one revolution.

Figures 3, 4, 5:
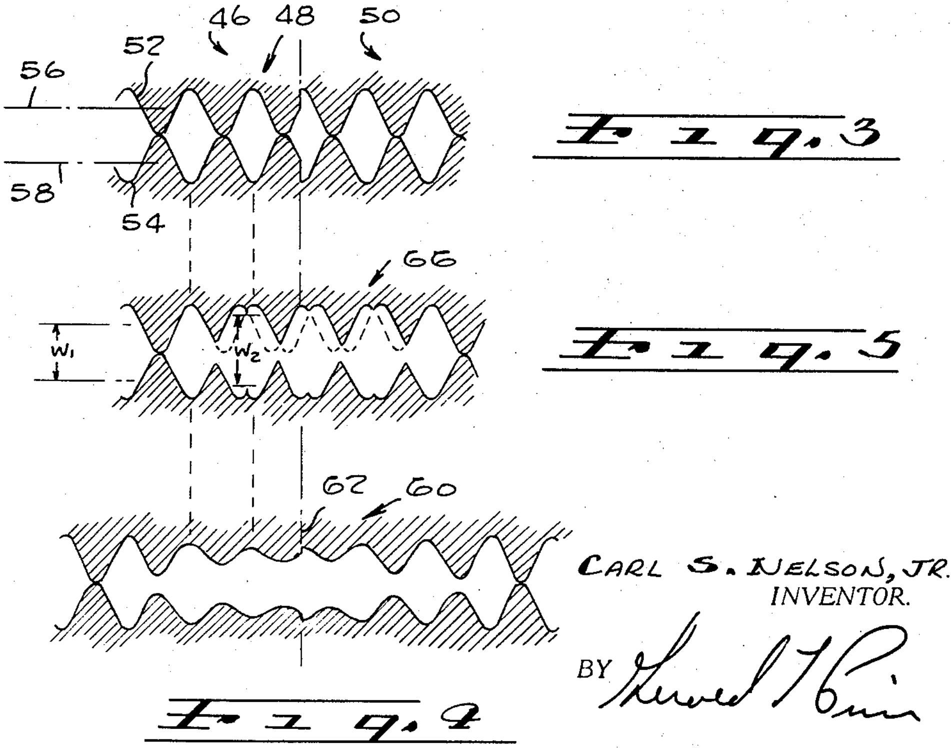
FIG. 3 is a simplified view of a joint region of an optical track that would result if no care were taken to smooth the joint.
FIG. 4 is a simplified view of the joint region of an optical track, resulting from utilizing only a reduction in music signal amplitude at distances closer to the location where the head and tail ends meet.
FIG. 5 is a simplified view of an optical track showing the joint region resulting from simply overlapping the head and tail ends of the recording.

The joint region where the head and tail ends meet, can generate objectionable effects when it is played. FIG. 3 illustrates the joint region of a simple music track 46, which can result where the recording of the track was controlled to last for precisely one revolution and where no special measures were taken to merge the head end 48 and tail end 50 at the joint. The track represents a simple sinusoidal wave defined by two borders 52, 54, the record being substantially completely transparent within the borders and substantially completely opaque in areas outside the borders, and each border varying sinusoidally about an average or bias defined by the imaginary lines 56, 58. In the example of FIG. 3, the extreme head and tail ends are out of phase by 90 degrees, so that the head end 48 is passing through zero while the tail end is passing through its maximum value where they meet. This results is a discontinuity at the joint that can create a "pop" or "click" sound due to the rapid variation in signal level at the joint. In any recording, the relationship between the head and tail ends may range from a condition where they are completely in phase, and therefore no objectionable noise is created, to a condition wherein they are 180° out of phase which may result in very objectionable noises.

In the case of a track that records a constant or rapidly repetitive sound, it is possible to make the head and tail ends smoothly merge by slightly increasing or decreasing the speed of the recording turntable 26. This is difficult to accurately perform in practice, and results in a change in pitch of the recording. Only a small percentage change in pitch is required in the case of higher frequency sounds, but correction for such tracks generally is not as important because the high frequency resulting from a discontinuity is closer in pitch to the higher frequency sound. However, in the case of tracks that record lower frequency sounds, where discontinuities are highly objectionable, the amount of frequency change that may be required to smoothly merge the head and tail ends can result in a high percentage change in pitch which is objectionable. This is particularly true in the case of complex sounds that have a lower frequency of repetition such as the rapid picking characteristic of a mandolin and low organ frequencies, and is especially true in the case of sounds that are not repetitious as in the case of an acompaniment arrangement where the head and tail ends of the recording may represent sounds of very different pitch and character.

One method for recording can minimize the "click" sound involves the reduction in amplitude of the track undulations at the head and tail ends, as indicated for the track 60 of FIG. 4. At the joint location 62 the undulations and resulting music signals are of low amplitude and therefore the click is not as noticeable. However, the decrease in amplitude along the joint region creates a noticeable "dropout" in sound that is objectionable. If the decrease in amplitude is accomplished in a short time such as only one cycle, the resultant wave has a large low frequency component that is highly noticeable, while if the decrease continues over many cycles, the reduction in volume is highly noticeable.

Another technique that can be utilized to help smooth the joint is ullustrated by the track 66 of FIG. 5, wherein the recording of the track is continued for slightly more than one revolution so that the head and tail portions overlap. While this can minimize clicking sounds, it can give rise to "chirping" sounds resulting from the double or other higher frequency signal component along the overlap. Such overlapping also creates a sudden change in average width of the track from the width $W_1$ to the width $W_2$, which creates unwanted sounds.

Figure 6:
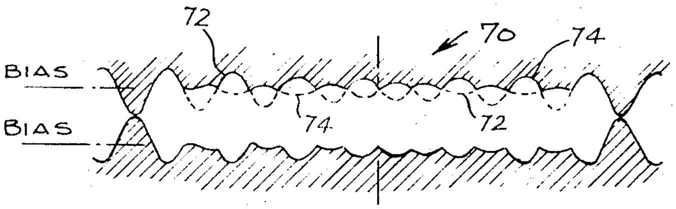
FIG. 6 is a simplified view of the joint region of an optical track, where a combination of overlapping of the head and tail ends is utilized in combination with gradual rise and decay of the music or other information signal at the head and tail ends of the recording.

Still another technique can be employed, which creates the track 70 of FIG. 6. This technique combines the technique indicated in FIGS. 4 and 5; that is, in the recording of the track of FIG. 6, the head and tail end portions have a decrease in modulation amplitude, and in addition the head and tail portions overlap. Of course, the width of the track at every location is the greater of the two overlapping signals, since even one exposure is sufficient to expose the photographic emulsion to saturation, so that the undulations along the joint can be said to be the geometric addition of the overlapping exposures. The Figure shows the variations of the head end 72 and tail end 74 during the actual recording, phantom lines being used in the Figure to show the portions which were incident on the film but have been masked by the opposite end portion and therefore do not appear in the final developed track. The technique utilized in FIG. 6 results in an increase in average track width along the joint, but the increase is relatively gradual. The joint is noticeably smoother than those utilizing any one of the techniques of the earlier Figures. This is partly due to the fact that the modulating or music signals gradually merge, and because the DC or bias level has a more gradual growth and decay.

Figure 7:
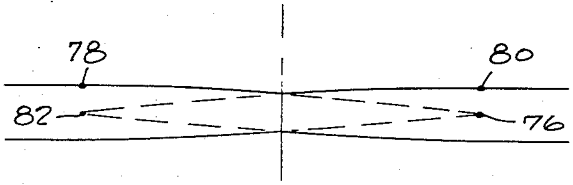
FIG. 7 illustrates the joint region of a track wherein gradual rise and decay of the bias, or average light beam width, is utilized at the head and tail ends, the track being shown without music signal modulation to aid in understanding.
Figure 8:
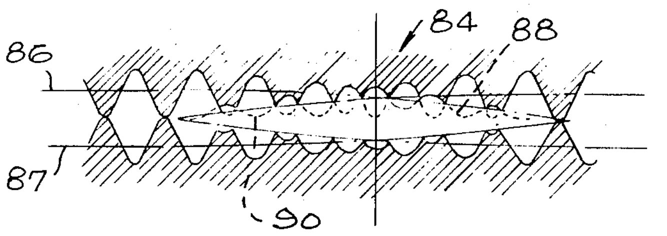
FIG. 8 is a view of the joint region of an optical track, wherein the head and tail ends overlap and both the amplification factor and bias level gradually increase at the head end and gradually decrease at the tail end, this being a preferred embodiment of the invention.

FIG. 8 indicates a preferred blending method of the invention, which utilizes the blending technique of FIG. 6 plus a technique of introducing a gradual rise and decay of the average or bias signal during recording. The rise and decay of bias signals is indicated in FIG. 7 for a waveform that contains no music signal, this figure serving to illustrate how the bias is made to increase from zero at point 76 to a maximum level at 78 along the head end of the recording. The bias remains constant from point 78 along almost 360° to point 80, where the bias gradually drcreases to zero at point 82. In the track of FIG. 8, the head and tail ends overlap in the joint region, both ends undergo a decrease in music signal amplification factors at locations further into the joint region, and both ends undergo a decrease in bias signal at locations further into the joint region. This type of joint provides a smooth merging of music sounds, a minimum of combined-frequency sounds or "chirping," a minimum of sudden bias increase that can cause popping sounds, and a minimum of large amplitude bias variation that can cause unwanted low frequency sounds. In the track 84 of FIG. 8 the bias signal is indicated by the lines 86, 87, the part of the head end that is masked and does not appear in the final track is indicated by the phantom line 88, while the part of the tail end that is masked and does not appear in the final track is indicated by the phantom line 90. Only the upper outlines of the masked parts of the head and tail are indicated.

Figure 10:
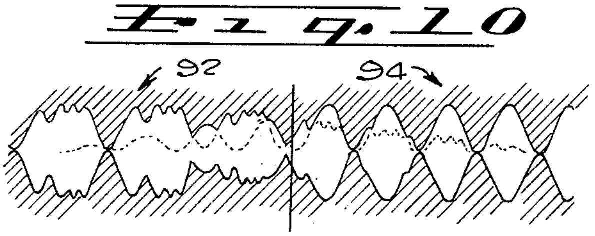
FIG. 10 illustrates the joint region of a musical track with musical signals near the head and tail ends of a very different character, and showing the resultant joint region where the head and tail portions overlap and the music signal amplification and bias level gradually change along the joint region.

The technique indicated in FIG. 8, using rise and decay at opposite overlapping ends of the recording for both amplification of the music signals and for the bias signal, is especially useful for complex or nonrepetitive sounds. FIG. 10 illustrates the result of this technique at the joint region of a track wherein the head end portion 92 represents a sound of different character and frequency than that represented by the tail end portion 94.

Figure 9:
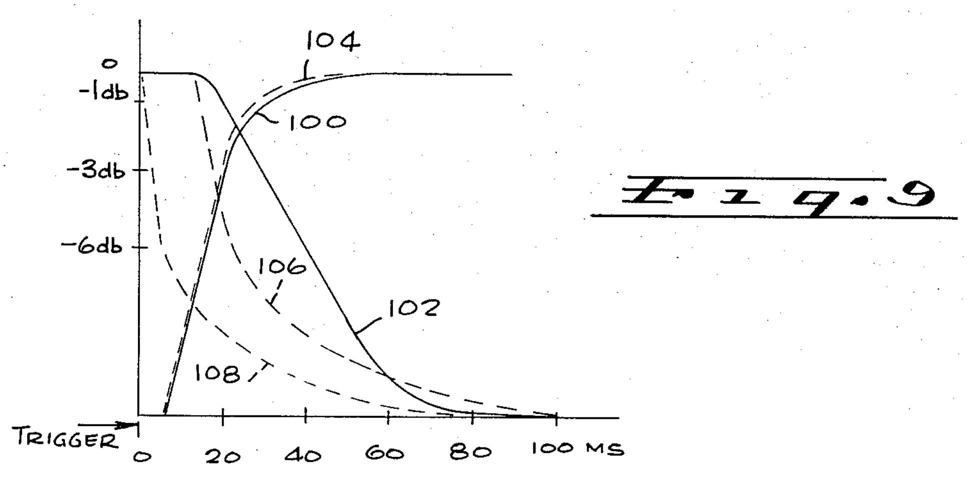
FIG. 9 is a graph illustrating the variation of the amplification and bias factors along the joint region of a musical or other information track.

The particular growth and decay rates for the bias function and the music signal amplification function, as well as the amount of overlap and the locations where growth and decay of the various functions begin, are the various factors that must be considered. A compromise is made between these factors, which produces the least objectionable sounds for the type of music or other information signal being played. The particular set of functions that are chosen as a compromise may be utilized for all tracks, or different compromises may be employed for different sets of tracks or even for each individual track. Generally, a rise and decay is desirable which is gradual so that it extends over a period exceeding one cycle of the fundamental frequency recorded on the music track. FIG. 9 illustrates a compromise set of functions that has been found satisfactory for a variety of music tracks to be played on an organ. This compromise was obtained empirically, with the major emphasis being on tracks of lower pitches where the most objectionable joint sounds generally have occurred in previous recordings.

In the function of FIG. 9 each graph indicates the variation in amplitude of a function with time, each variable rising from a very small value to a final value which it remains at during most of the length of the track. The ampitudes of the variables are graphed on a logarithmic or decibel scale, with the maximum or normal value which exists during most of the track length indicated as zero decibels. The graph 100 represents the light valve bias function along the head end while the graph 102 represents the bias function at the tail end. The graph 104 represents the amplification factor at which the musical or other information signals are amplified at the head end, while the graphs 106 and 108 represent two alternate functions of the music signal amplification factor at the tail end. The graph 106 was found satisfactory for tracks of medium and higher frequency pitches while the function at 108 was found satisfactory for tracks with lower frequency pitches.

The horizontal or timing scale in the plot of FIG. 9 is with reference to a trigger time "zero" which occurs when a trigger marker 40 (FIG. 2) on the turntable passes a sensor. A very important region for the rise and fall of each function is the region that occurs between −3db and −1db of the maximum or zero db level of the function, inasmuch as each function only partially masks or is only partially masked by the other at these levels. Both the rising bias signal or function 100 and the rising music signal amplification function 104 pass between the 31 3db and −1db levels in a period of about nine milliseconds. A rise through this level of between about 3 milliseconds and 30 milliseconds is desirable for a wide variety of musical tracks and other complex information signals. The falling bias signal 102 decreases from −1db to −3db in a period of about 11 milliseconds. It is also generally desirable that this function 102 also decrease between the −1db and −3db levels in a period between about 3 and 30 milliseconds, so that when it overlaps the correspondingly rising bias signal of the head end, there is a relatively slow change in total bias to minimize the creation of low frequency sounds, and the sum bias level does not rise to a high value. It may be noted that at a 3 millisecond period of decay, at least one cycle of every tone above about 330 cps is covered by the decay period. Both of the alternate falling music amplification functions 106 and 108 decrease through the −1db to −3db range in periods of about 4 milliseconds.

Figure 11:
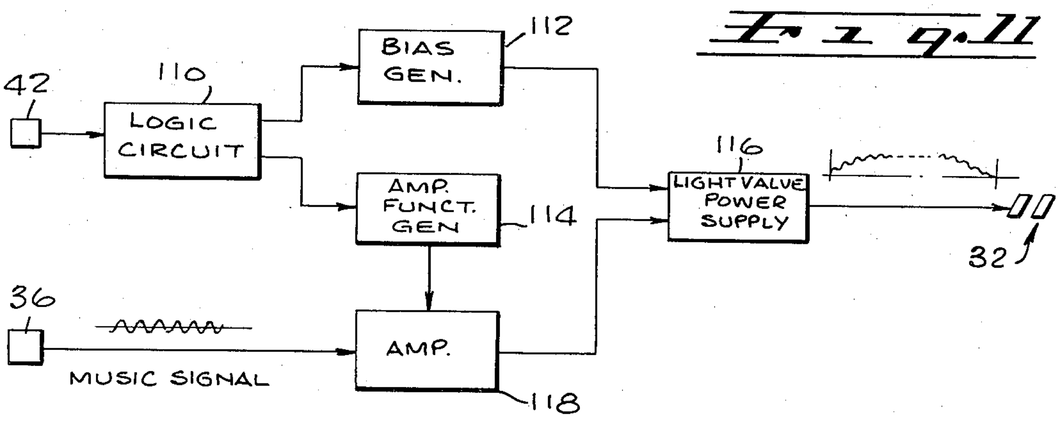
FIG. 11 is a highly simplified block diagram of recording apparatus constructed in accordance with the invention, which can provide the variations of amplification and bias indicated in FIG. 9.

FIG. 11 is a simplified representation of one circuit for employment as the control circuit of FIG. 2 to control the width of the light beam that records musical and other information sounds on the optical disc. The apparatus includes a logic circuit 110, that receives signals from the trigger sensor 42 and which activates a bias generator 112 and an amplification function generator 114. These generators 112 and 114 determine the rise and fall functions of the bias signal and music or other information signal. The bias generator 112 has an output that can be delivered to a light valve driving circuit 116 whose output signal controls the nominal width of the bi-lateral light valve 32. The output of the music amplification function generator 114 is delivered to an amplifier 118 which also receives music or other information signals from the master player 36. The output of the amplifier 118 consists of the information signals amplified (the amplification factor may be less than one) in accordance with the rise and fall functions chosen for the information signals. The output of the amplifier 118 is also delivered to the light valve driving circuit 116 which drives the light valve 32 in accordance with the sum of the bias and amplified music signals.

Figure 13:
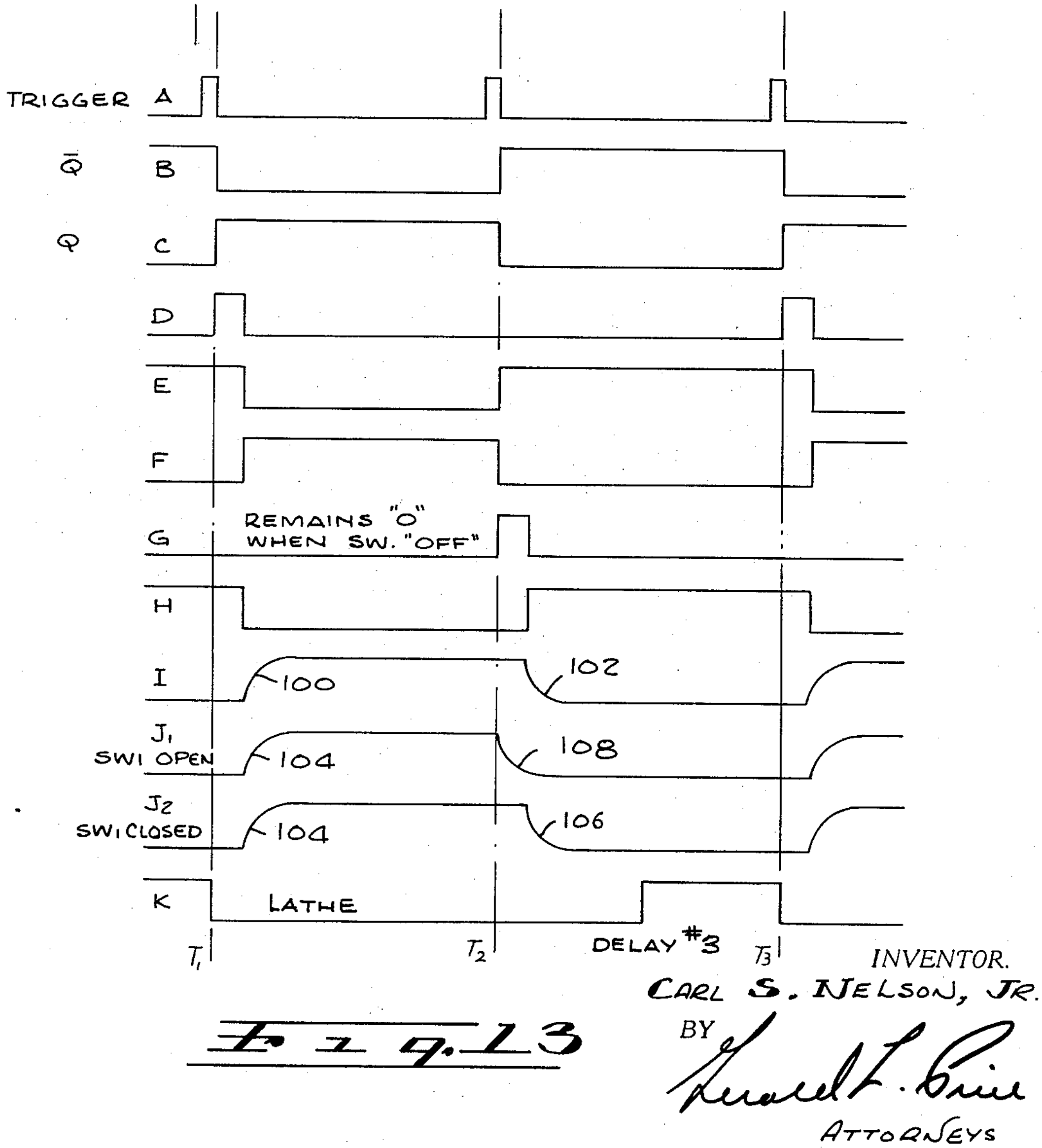
FIG. 13 illustrates logic signals utilized in the circuitry of FIG. 12.
Figure 12:
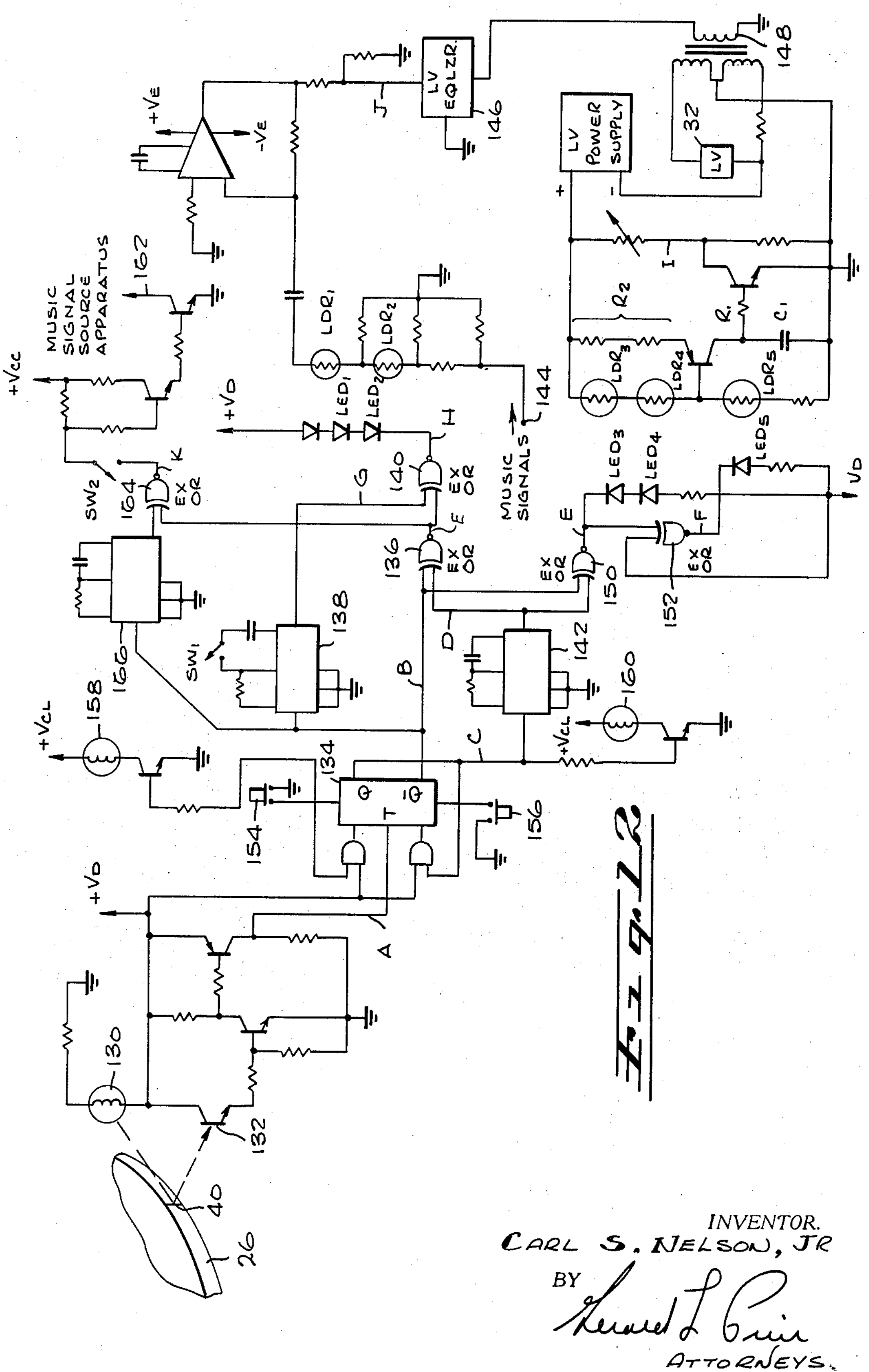
FIG. 12 is a schematic diagram of a control circuit which controls recording in accordance with the functions shown in FIG. 9.

FIG. 12 is a detailed illustration of another control circuit that is utilized to control the light valve 32 during recording. Various signals generated by the circuit of FIG. 12 are shown in FIG. 13 during a first revolution of a recording turntable which occurs between times $T_1$ and $T_2$, and during a second revolution occurring between $T_2$ and $T_3$. The circuit includes a lamp 130 that shines light at the turntable so that the reflective marker 40 thereon can reflect light to a light sensitive phototransistor 132. The pulse detected by the phototransistor 132 is amplified so that the pulse A is generated. The pulse A triggers a flip flop 134 to cause it to generate the signals B and C. The signal B enters an exculsive OR gate 136, and the signal B also passes through a delay circuit 138 that generates the signal G which enters another exclusive OR gate 140. The signal C passes through a delay circuit 142 whose output D also enters the exclusive OR gate 136. The output E of the gate 136 enters the gate 140, whose output is H. This output H passes through two light emitting diodes $LED_1$ and $LED_2$.

The two light emitting diodes $LED_1$ and $LED_2$ illuminate two light dependent resistors $LDR_1$ and $LDR_2$ which have an appreciable rise time. The music signals from a master record player or information signal generator, enter through an input 144 and pass through the light dependent resistor to a light valve equalizer 146. When the music signals are zero, the signal J entering the equalizer 146 represents the amplification functions 104, 106 and 108 of FIG. 9. The portion of the signal J immediately after the time $T_1$ rises in accordance with the function 104. The portion of the signal J occurring immediately after the time $T_2$, which represents the turntable completing one revolution during recording, has a decay function that can begin immediately or which can be delayed. When the switch $SW_1$, which may be a one shot multivibrator, of the delay circuit 138 is open, the signal $J_1$ is generated (see FIG. 13) whose decay portion represents the function 108. When the switch $SW_1$ is closed, the decay portion is delayed and it then represents the function 106.

When music signals are present at the input 144 (FIG. 12), they are amplified by a factor represented by the signal J. These signals pass through the equalizer 146 and through a coupling transformer 148 to the light valve 32 to modulate the light valve opening in accordance with the music signals.

The generation of the bias signal function utilizes the signal E, which is obtained from another exculsive OR gate 150 whose inputs are the signals B and D. Another exclusive OR gate 152 generates the signal F which is the complement of E, and the signals alternately illuminate light emitting diodes $LED_3$ and $LED_4$ or the light emitting diode $LED_5$. These diodes illuminate three light dependent resistors $LDR_3$, $LDR_4$, and $LDR_5$ that generate the signal I. The signal I represents the bias function that determines the nominal beam width that is modulated by the music siganls. The leading portion of the signal I, which occurs immediately after the time $T_1$, is the function 100 illustrated in FIGS. 9 and 13, while the end or decay portion, which occurs immediately after the time $T_2$, represents the decay portion 102. The signal I is added to the music or information signal in the coupling transformer 148 to control the bias of the light valve 32.

The circuit includes additional controls and lights for facilitating its operation. A pair of push buttoms 154 and 156 enable control of the circuit by manually toggling the flip flop 134. A pair of indicator lamps 158 and 160 show the condition of the flip flop output. A circuit output 162 which controls a master record player, or music signal source apparatus, can carry a signal when a switch $SW_2$ is closed. The switch $SW_2$ controls the passage of the signal K which is obtained from an exculsive OR gate 164 which has one input that is the signal E and another input which is the signal B delayed by a delay circuit 166.

In the circuit of FIG. 12, the functions governing rise and decay of the bias and amplification are obtained by utilizing the delay chracteristics of light dependent resistors. This is a simple method for obtaining the functions, but a wide variety of circuits can be utilized to derive the desired functions.

Thus, the invention provides a method for recording music or other information on a re-entrant track, in a manner that smooths the joint where the head and tail ends of the track meet to thereby minimize objectionable effects. This is accomplished by recording for a length greater than the length of the track, so that the head and tail end portions overlap, and by providing a continuous or gradual rise at the head end and a continuously or gradual decay at the tail end of both the music signal amplification factor and the bias. A rise and decay of either the music amplification factor 0r the bias can be highly beneficial, while the rise and decay of both of these provides optimum joining. In the recording of an endless optical track on a record medium such as an optical disc, the modified music signal and bias signal control the width of a light beam, and the light beam is of an intensity that exposes a photographic emulsion to saturation, so that the joint region where the head and tail end portions overlap may be considered as a geometric addition or "or" function. By recording in this manner, an optical record track is generated with a joint region that provides a smooth passage from the music signals defined on one side of the joint into the music signals defined on the other side of the joint. Specifically, those signals on either side of the joint continuously decay in both bais magnitude and signal amplification factor at locations progressively further from their respective sides of the joint. The recroding of the record is accomplished by apparatus that generates a signal that variably amplifies the music signals in accordance with a predetermined function and that generates another signal that provides a variable bias in accordance with a predetermined bias function. In the described embodiment, the signal that amplifies the music signals is represented by the signal J, which is the result of the delay provided by delay circuits and the rise and decay functions of light dependent resistors that provide a variable fractional amplification or attenuation of the music signals. The bias signal is obtained from a delayed signal that is also modified by the delay characteristics of other light dependent resistors. The method of the invention is useful in the recording of music signals, but is also useful in the recording of other information signals as a re-entrant track and particularly complex information signals.

Although particular embodiments of the invention have been described and illustrated herein, it is recognized that modifications and variations may readily occur to those skilled in the art and, consequently, it is intended that the claims be interpreted to cover such modifications and equivalents.

What is claimed is:

1. A method for producing a musical optical disc record with a re-entrant track comprising:

rotating a photographically sensitive optical disc at a constant speed;

generating music signals representing the music to be recorded;

modulating the width of a light beam directed at a location on said record, during a predetermined rotational movement of said record of more than 360°, in accordance with a controlling signal that includes said music signal amplified by a predetermined substantially constant factor during most of said predetermined record movement and a bias signal which is at a predetermined substantially constant level during most of said predetermined record movement;

increasing said bias signal from an initial level which is below said predetermined constant level thereof to said predetermined constant level thereof during a beginning portion of said predetermined rotational record movement;

decreasing said bias signal from said predetermined constant level to substantially said initial level thereof during an ending portion of said rotational record movement that overlaps at least part of said beginning portion;

increasing the amplification factor of said music signal up to said predetermined constant factor from an initial relatively low factor during said beginning portion; and decreasing said amplification factor of the music signal from said predetermined constant factor to substantially said initial low factor during said ending portion.

2. A method for producing a musical optical disc record with a re-entrant track according to claim 1; in which the level of said bias signal is varied during said beginning and ending portions between −1db and −3db of its maximum level during periods that are greater than 3 milliseconds and less than 30 milliseconds.

3. In apparatus for producing a musical re-entrant optical track on a photographic disc including a recording head for directing onto said disc a light beam of a width dependent upon the amplitude of musical signals energizing the head and of an intensity sufficient to fully expose portions of said photographic disc struck by said light beam, means for moving the photographic disc in a rotational path relative to the head, and playing means to produce said musical signals for energizing the head during a recording period corresponding to a predetermined rotational movement of said disc relative to said head which is slightly greater than one complete revolution, the improvement comprising:

amplifier means for amplifying said musical signals supplied from said playing means to said head;

bias producing means coupled to said head for producing a bias signal that adds to the musical signal;

bias control means for controlling the amplitude of said bias signal in a first bias function that continually increases to a predetermined normal bias level during a starting period that is a fraction of said recording period and in a second bias function that continually decreases from substantially said normal bias level during a final period that is a fraction of said recording period; and amplifier control means controlling said amplifier means for progressively increasing the amplification of said musical signals up to a normal level during said starting period and for progressively decreasing said amplification from said normal level during said final period.

4. In the method of producing a re-entrant optical track on an endless photographic disc by moving the disc relative to a recording head while introducing information signals to the head from a master record or the like during approximately one revolution of the disc relative to the head, and wherein said recording head includes means for directing a light beam of a width dependent upon the signal amplitude input thereto onto said disc to photographically expose it, said light beam being of an intensity that fully exposes said photographic disc so that a double exposure of a region of the disc by said head does not appreciably affect the degree of exposure thereof, the improvement comprising:

modulating the width of said light beam about a nominal width by said information signals while directing the light beam at said photographic disc to form a bi-lateral optical track thereon, during a recording period which exceeds by a fraction the time required for movement of the disc relative to the recording head by one complete revolution, so that leading and trailing portions of the optical track overlap on the record medium;

amplifying said information signals by a gradually increasing factor during a beginning portion of the recording period corresponding to said leading portion of the track and by a gradually decreasing factor during an ending portion of the recording period corresponding to said trailing portion of the track;

gradually increasing the nominal width of said light beam during an initial period portion which includes at least part of said beginning portion of said recording period; and gradually decreasing the nominal width of said light beam during a final period portion which includes at least part of said ending portion of said recording period.

* * * * *